(12) United States Patent
Ui

(10) Patent No.: US 6,530,860 B2
(45) Date of Patent: Mar. 11, 2003

(54) LINE PRESSURE CONTROL DEVICE FOR CONTINUOUS TRANSMISSION IN VEHICLE

(75) Inventor: Shinsuke Ui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/850,170

(22) Filed: May 8, 2001

(65) Prior Publication Data

US 2002/0052264 A1 May 2, 2002

(30) Foreign Application Priority Data

Nov. 1, 2000 (JP) ......................... 2000-334704

(51) Int. Cl.$^7$ ............................................. B60K 41/14
(52) U.S. Cl. ........................ 477/45; 477/107; 477/158; 474/28
(58) Field of Search ............................. 474/28; 477/44, 477/45, 107, 111, 158, 159

(56) References Cited

U.S. PATENT DOCUMENTS

| | | | | |
|---|---|---|---|---|
| 4,478,105 A | * | 10/1984 | Yamamuro et al. | 477/45 |
| 4,638,689 A | * | 1/1987 | Sakai | 477/163 |
| 4,736,301 A | * | 4/1988 | Osanai | 477/43 |
| 4,771,658 A | * | 9/1988 | Miyawaki | 477/45 |
| 5,042,325 A | * | 8/1991 | Sawasaki et al. | 477/45 |

FOREIGN PATENT DOCUMENTS

JP 4-272569 9/1992 ........... F16H/61/00

* cited by examiner

*Primary Examiner*—Ankur Parekh
(74) *Attorney, Agent, or Firm*—Sughrue Mion, PLLC

(57) ABSTRACT

The present invention provides a line pressure control device for a continuous transmission in an automotive vehicle, wherein a life of a belt is capable of being lengthened by avoiding a slip of the belt under any running conditions. The line pressure control device comprises a pressure control valve for generating a line oil pressure of an oil pressure line by controlling an output oil pressure of an oil pressure pump, the continuous transmission for changing a rotating speed of an internal combustion engine manipulated by the line oil pressure, a controlling process of a required line oil pressure for conveying an input torque of the continuous transmission from a throttle opening signal of the internal combustion engine, and an input and an output shaft rotating speeds of the continuous transmission, a memorizing process of the characteristics data of an output oil pressure for the oil pressure pump, a process of computing a possible output line oil pressure of the oil pressure pump from the characteristic data of the output oil pressure and the input shaft rotating speed and comparing the required line oil pressure with the possible output line oil pressure, and a control means for controlling a rotating speed and an output torque of the internal combustion engine, wherein the required line oil pressure is kept within the possible output line oil pressure.

2 Claims, 7 Drawing Sheets

LINE PRESSURE CONTROL DEVICE FOR CONTINUOUS TRANSMISSION IN VEHICLE

TECHNICAL FIELD

The present invention relates to an line pressure control device, and more particularly to a line oil pressure control device for a continuous transmission in an automotive vehicle, wherein a line oil pressure is obtained from an output oil pressure of an oil pressure pump driven by an internal combustion engine, and the line oil pressure is controlled to be a pressure corresponding to a transmission torque by controlling the output oil pressure.

BACKGROUND ART

A prior art configuration of a continuous transmission, also known as a continuously variable transmission or CVT, in an automotive vehicle is disclosed, for example, in Japanese laid open Patent No.4-272569. As is shown in this art, the configuration is frequently used, wherein a belt is tightened over a pair of pulleys, and a rotation ratio of a driving side and a driven side is controlled by mutually changing a gap width of the pair of pulleys.

A mechanism for changing the gap width of the pulleys will now be described. First, a line oil pressure is procured from an oil pressure of an oil pressure pump driven by an internal combustion engine laden in a vehicle. Second, the line oil pressure is changed by controlling an output oil pressure of the oil pressure. Finally, a movable conical disk making up the pulleys is displaced in the axial direction towards a fixed conical disk according to a change of the line oil pressure.

In a control of the line oil pressure of the continuous transmission in the vehicle of this kind, it is required to make an effective transfer of a driving force between the belt and the vehicle. Therefore, it is absolutely necessary for obtaining an oil pressure for the belt, wherein a durability of the belt is not damaged by strictly lessening a slip of the belt between the driving and the driven sides. Furthermore, it is indispensable to suppress a power loss of the oil pressure pump by preventing the line oil pressure from being raised above a required level. To overcome these difficulties, a method is commonly used wherein an aimed line oil pressure according to the running conditions is set, and the output oil pressure of the oil pressure pump driven by the internal combustion engine is controlled to coincide with the aimed line oil pressure as is shown in a flow chart of FIG. 6.

In step 601 of FIG. 6, a base value of the aimed line oil pressure is computed from the input information to a controller concerning a torque of the internal combustion engine and a transmission ratio of the continuous transmission. Next in step 602, a compensating value for the base value of the aimed line oil pressure is computed based on the information from the various sensors detecting the running conditions. In step 603, a final aimed line oil pressure is computed by adding the compensating value with the base value of the aimed line oil pressure, and in step 604, all these steps are repeated periodically.

In the prior art as described above, in setting the aimed line oil pressure, it is required to set a rotating speed of the internal combustion engine as small as possible to improve a gasoline mileage, and simultaneously to raise the rotating speed of the engine for avoiding the slip of the belt due to a shortage of the output oil pressure from the oil pressure pump so that the line oil pressure corresponding to a transmission torque is obtained. Therefore, to satisfy these contradictory conditions, the rotating speed of the internal combustion engine is set so as to obtain a minimum aimed line oil pressure in a range wherein no slip of the belt occurs, and also, the setting of the internal combustion engine speed must be executed to cause no slip of the belt under variously and constantly changing running conditions of the automotive vehicle.

However, as shown in FIG. 7, the oil pressure pump is driven by the engine whose rotating speed is shown as a curve E, a possible output line oil pressure shown as a curve F becomes small in a low rotating zone, and a margin for the aimed line oil pressure shown as a curve G is small. Therefore, when the running conditions of the vehicle having a conventional control device of the line oil pressure is changing, the engine is unable to follow a change of the aimed line oil pressure by means of raising the output oil pressure of the oil pressure pump. Accordingly, a zone T takes place, wherein the belt wears by the slip, and a change of the running conditions due to the slip is inevitable. The zone T is defined between timing points t1 and t2. At the timing point t1 in the raising portion of the aimed line oil pressure, aimed line oil pressure is equal to the possible line oil pressure, and the timing point t2 in the raising portion of the possible line pressure, possible line oil pressure is equal to the aimed line pressure.

SUMMARY OF THE INVENTION

In view of the above, it is the object of the present invention to provide an oil pressure control device for a continuous transmission in an automotive vehicle, wherein a slip of a belt of the continuous transmission is capable of being avoided, and a life of the belt is lengthened.

According to this invention, a line pressure control device for a continuous transmission for an automotive vehicle, wherein a continuous transmission mechanism is actuated by an controlled oil pressure in an oil pressure line and outputs a transmitted speed from a rotating speed of an internal combustion engine, the line pressure control device comprises:

an oil pressure pump actuated by the internal combustion engine and generating an output oil pressure in the oil pressure line, a pressure control means for generating the controlled oil pressure in the oil pressure line by controlling the output oil pressure of said oil pressure pump, a throttle opening sensor for generating a throttle opening signal based on a opening of a throttle valve in the internal combustion engine, an engine rotating speed sensor for generating an engine rotating speed signal based on a rotating speed of the internal combustion engine, a transmission rotating speed sensor for generating an input rotating speed signal and an output rotating speed signal based on an input rotating speed and an output rotating speed of the continuous transmission mechanism respectively, and a controller including a memory for memorizing the output oil pressure characteristics for a rotating speed of said oil pressure pump, wherein said controller computes an input torque to the continuous transmission mechanism, a required line oil pressure for transmitting said input torque from said throttle opening signal, said input rotating speed signal and said output rotating speed signal, and a possible output line oil pressure from said output oil pressure characteristics and said engine rotating speed signal, and said controller controls the speed and output torque of the internal combustion engine so that said required line oil pressure becomes no more than said possible output line oil pressure by comparing said required line oil pressure with said possible output line oil pressure.

Furthermore, the line pressure control device for the continuous transmission mechanism in the automotive vehicle, wherein if said possible output line oil pressure is judged smaller than said required line oil pressure, said controller controls in a way to raise said speed of the internal combustion engine, and lower a transmission ratio of the continuous transmission mechanism, thereby decreasing said output torque of the internal combustion engine.

The line pressure control device for the continuous transmission mechanism in the automotive vehicle in accordance with this invention is adapted to avoid a slip of a belt of the continuous transmission mechanism and to lengthen a life of the belt, by increasing a rotating speed and an output torque of the internal combustion engine according to the need, while the rotating speed and output torque of the internal combustion engine are possibly maintained to lower value, and then to obtain more smooth transmission even if a running condition is changed.

DETAILED DESCRIPTION OF THE PREFERRED EMBODIMENT

Figure 1:
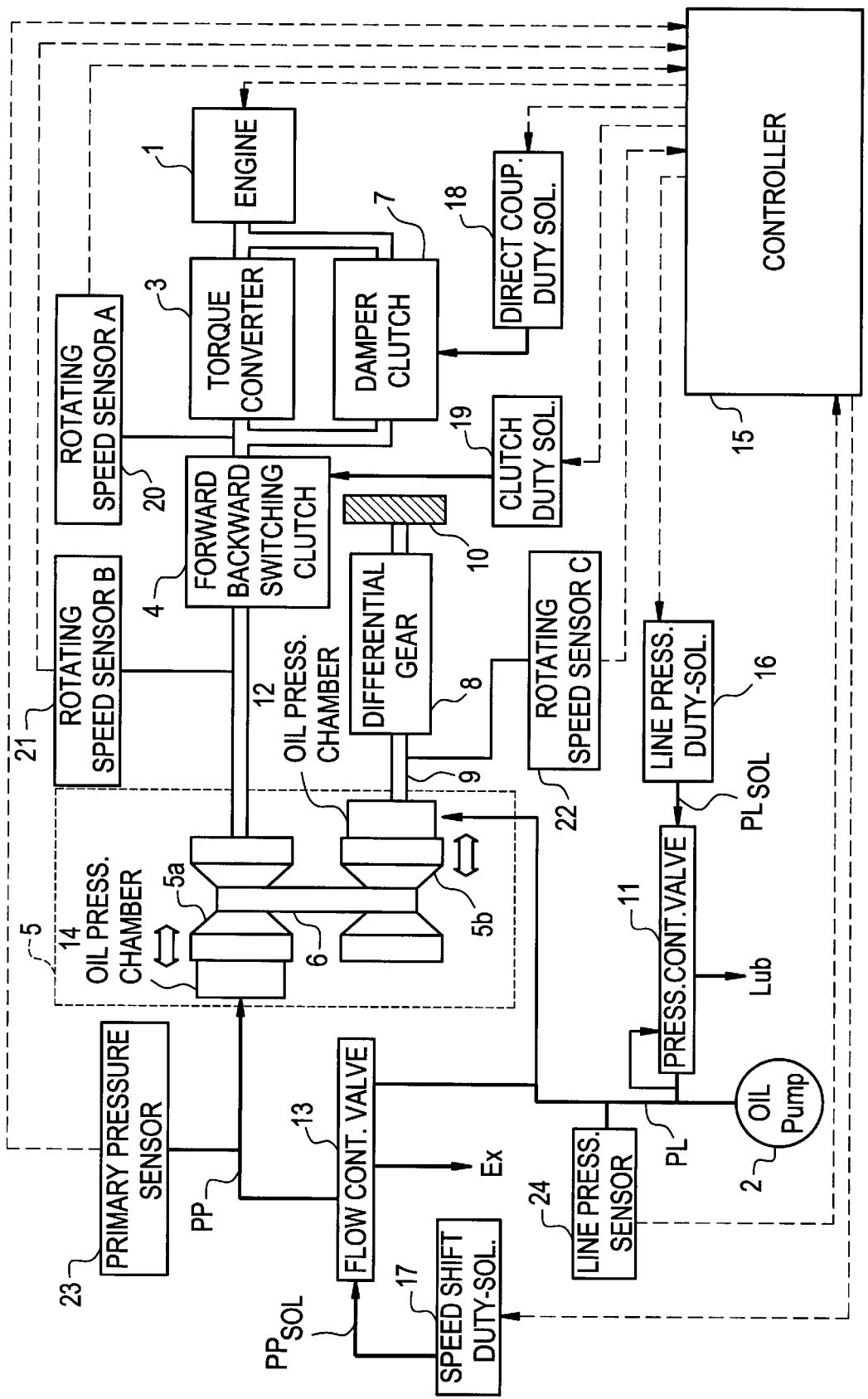
FIG. 1 shows a configuration of a line pressure control device for a continuous transmission in an automotive vehicle in an embodiment 1 according to the present invention.
Figure 2:
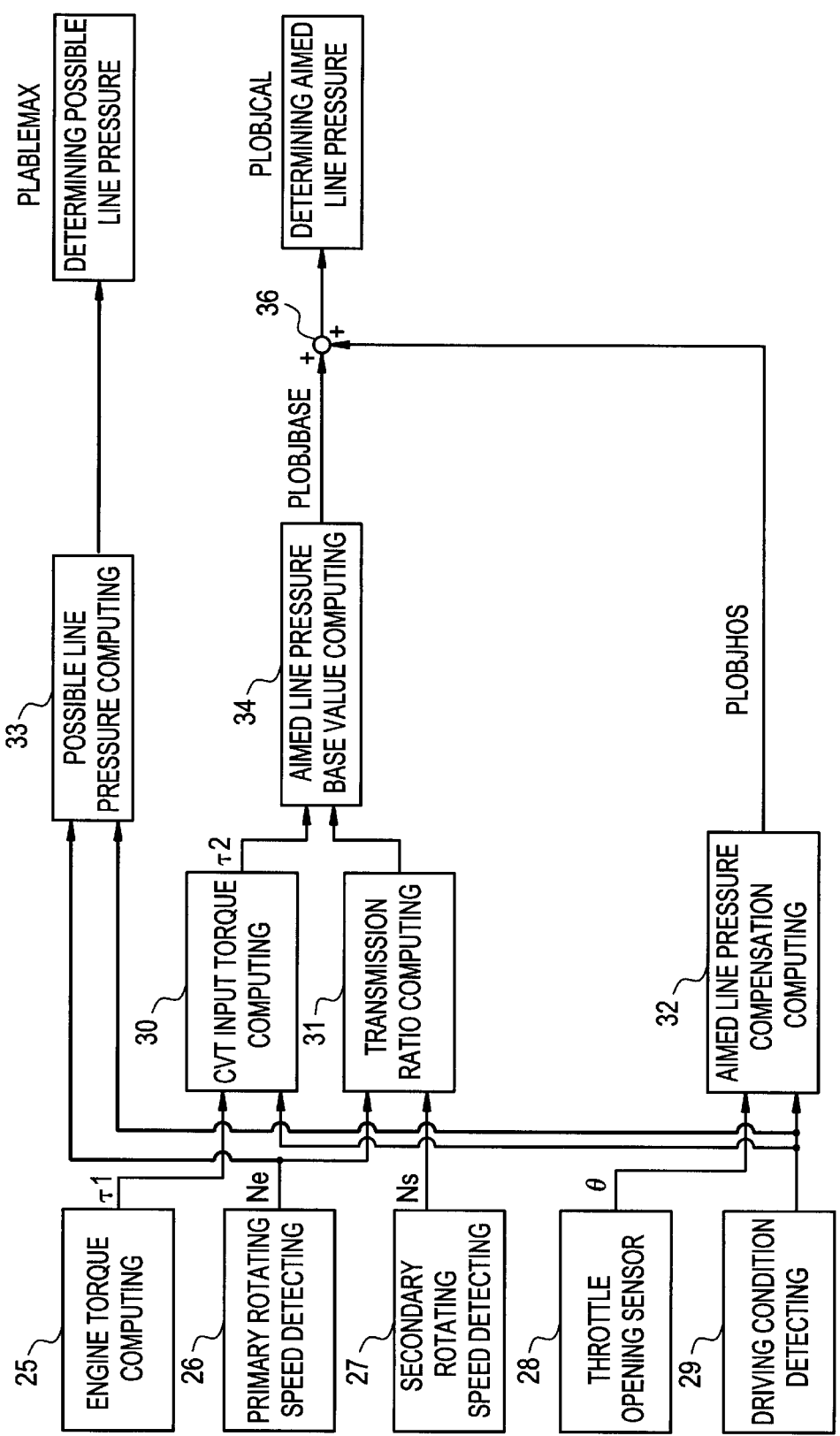
FIG. 2 is a functional block diagram of the line pressure control device for the continuous transmission in the automotive vehicle in the embodiment 1 according to the present invention.
Figure 3:
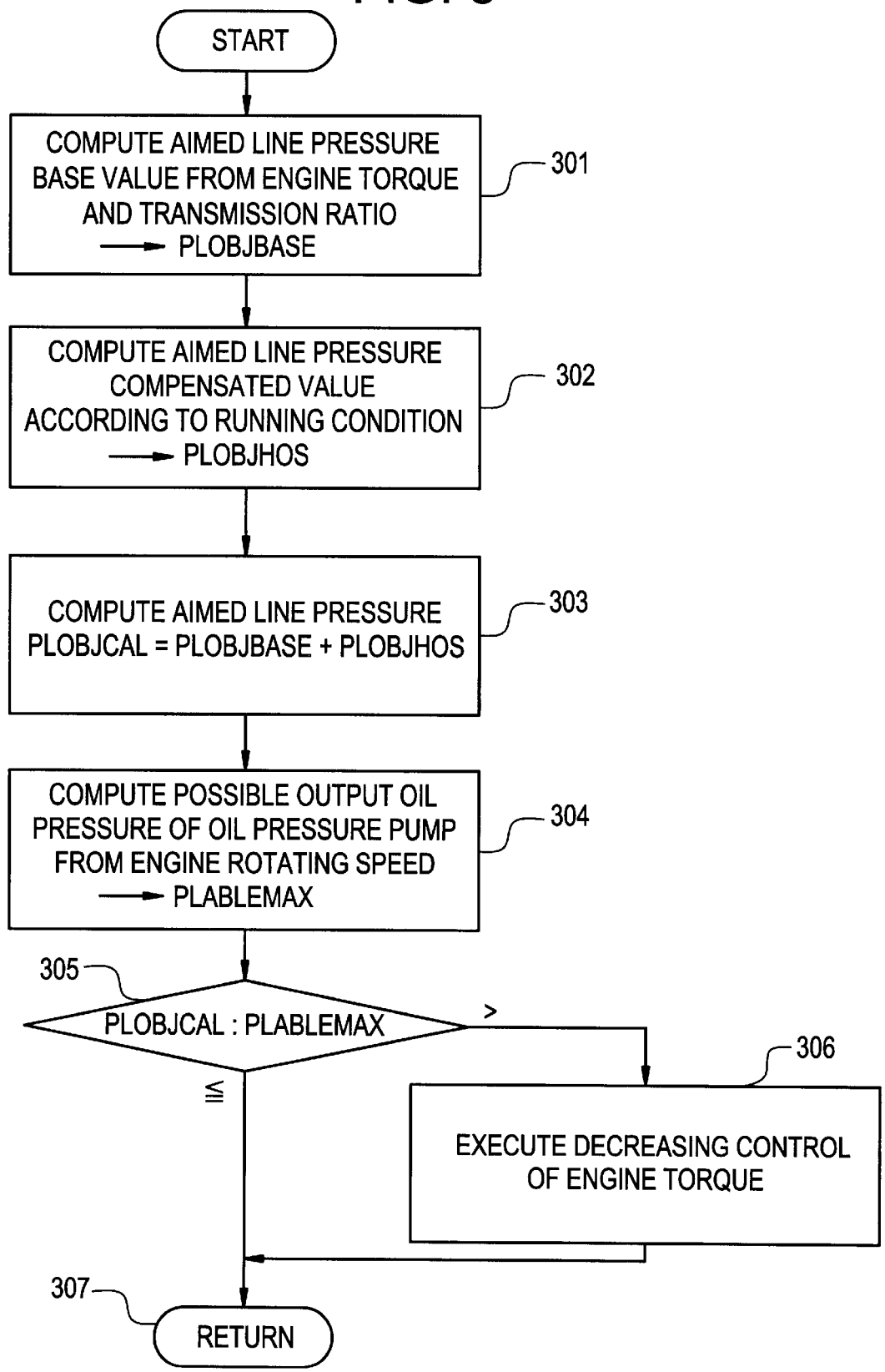
FIG. 3 is a flowchart for explaining a function of the line pressure control device for the continuous transmission in the automotive vehicle in the embodiment 1 according to the present invention.
Figure 4:
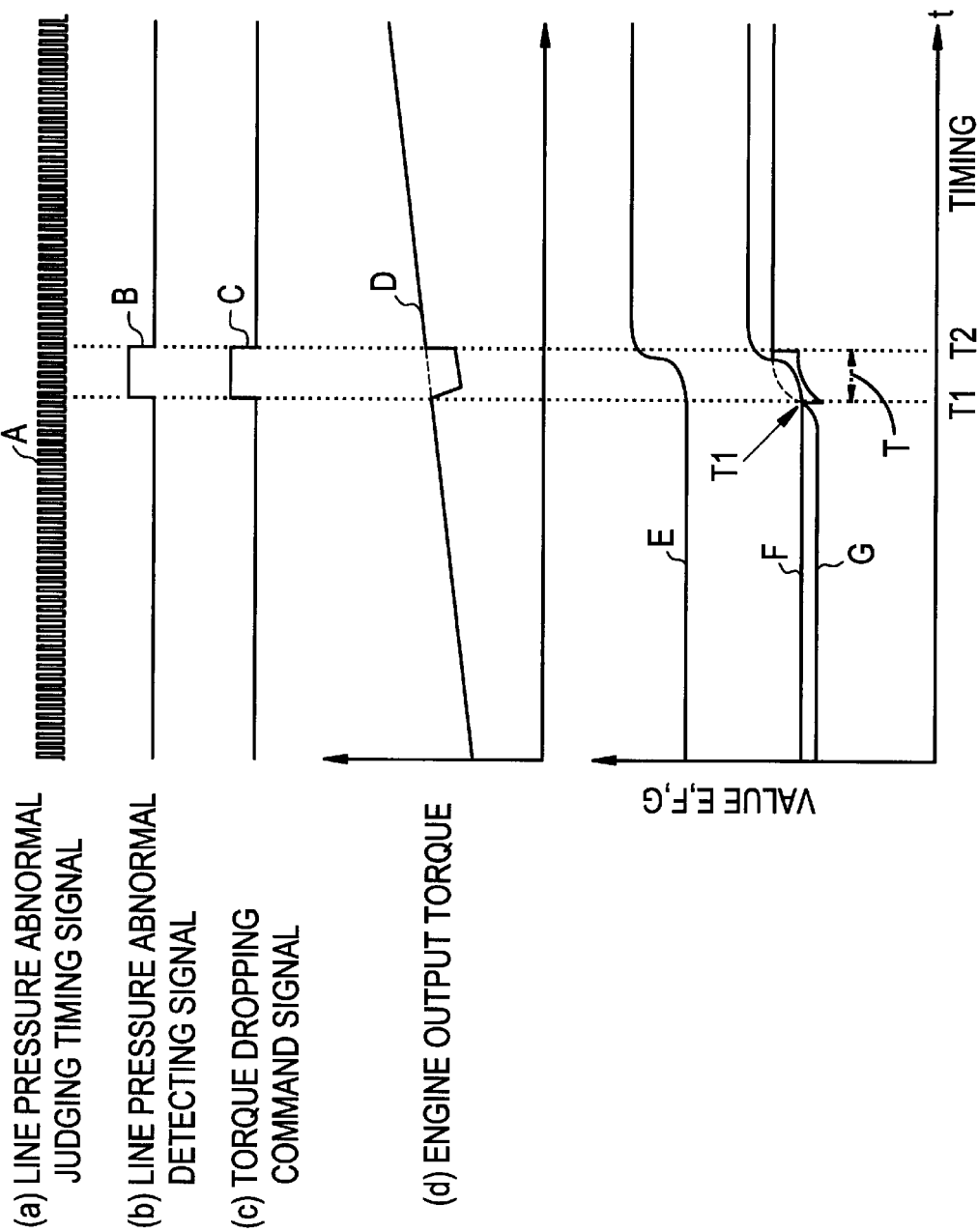
FIG. 4 is timing chart for explaining a function of the line pressure control device for the continuous transmission in the automotive vehicle in the embodiment 1 according to the present invention.
Figure 5:
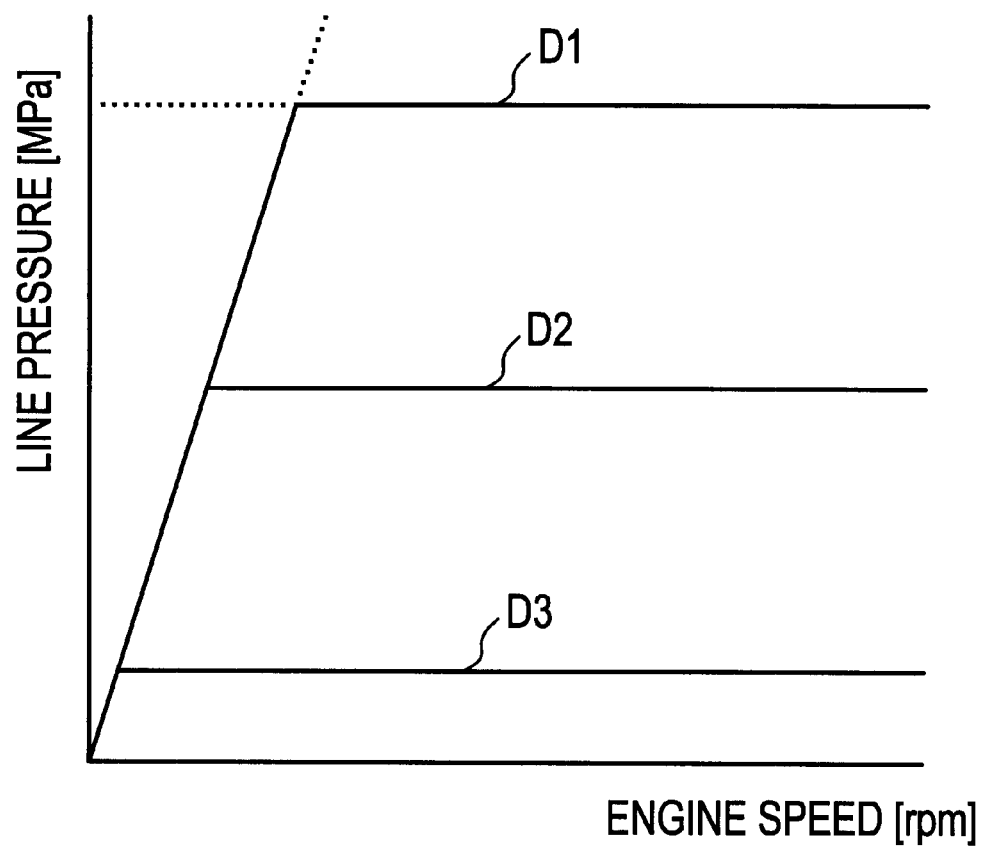
FIG. 5 is an example of a characteristic curve of an oil pressure pump in the line pressure control device for the continuous transmission in the automotive vehicle in the embodiment 1 according to the present invention.
Figure 6:
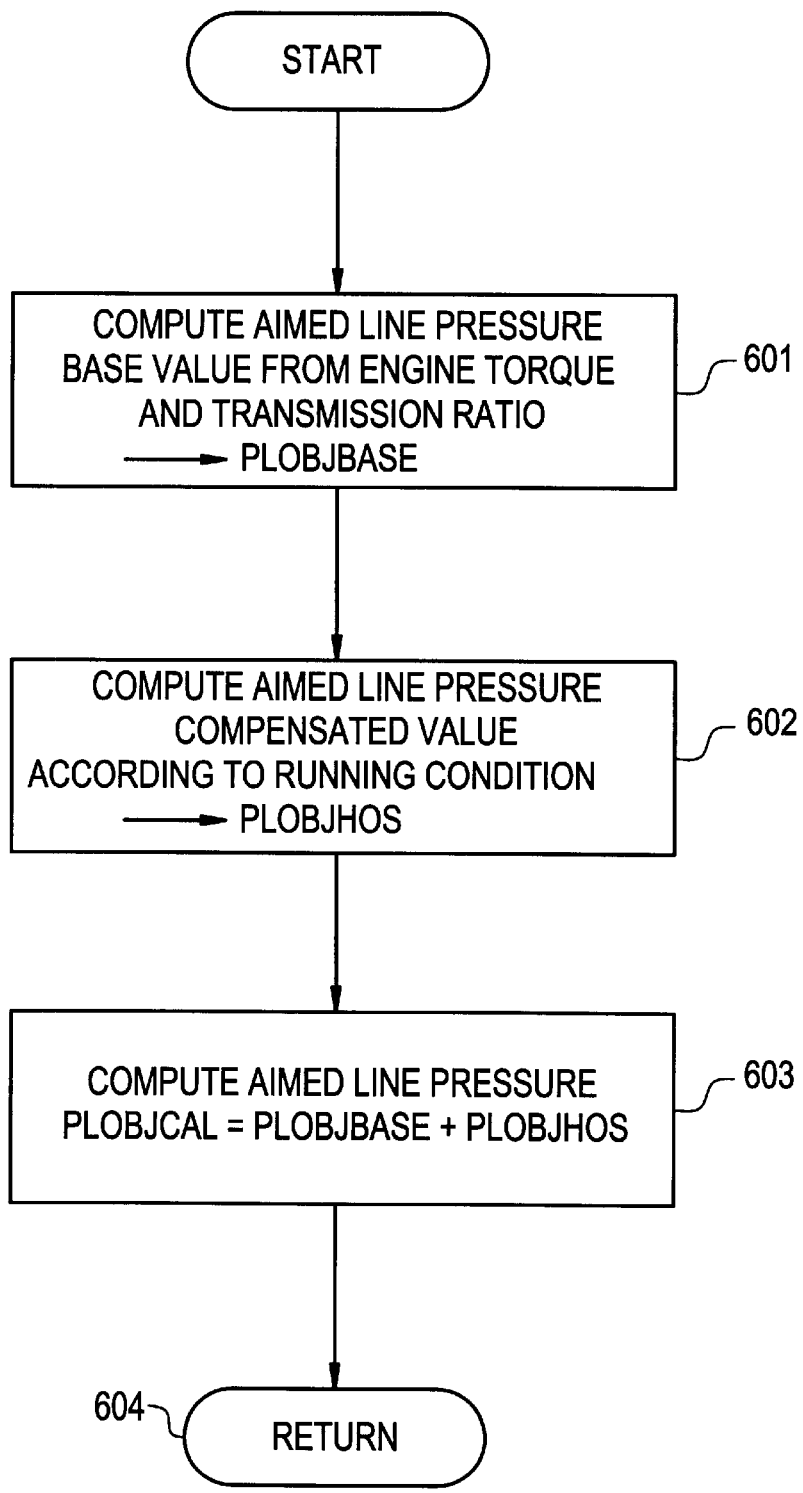
FIG. 6 is a functional flowchart of a line pressure control device for a continuous transmission in an automotive vehicle in a prior art.

FIG. 1 to FIG. 5 are for explaining a line pressure control device for a continuous transmission in an automotive vehicle in an embodiment 1 according to the present invention. More in detail, FIG. 1 is a configuration of a control system for the continuous transmission, FIG. 2 is a functional diagram of a controller, FIG. 3 is a functional flowchart of the controller, FIG. 4 is a timing chart for explaining a function, and FIG. 5 is a characteristic curve of an output oil pressure for an oil pressure pump as an example.

In FIG. 1, an internal combustion engine 1 laden in the vehicle is for generating an output torque, an oil pressure pump 2 is for generating an oil pressure for a continuous transmission to be explained later on, a torque converter 3 is for conveying the output torque of the internal combustion engine 1 to the continuous transmission 5 through a forward-reverse switching clutch 4. And the continuous transmission 5 consists of a primary pulley 5a on a driving side and a secondary pulley 5b on a driven side with a metallic belt 6 tightened between the two pulleys. A damper clutch 7 compensates a slip of the torque converter 3, and directly couples the internal combustion engine 1 with the forward-reverse switching clutch 4, a differential gear 8 is coupled to the secondary pulley 5b of the continuous transmission 5 through a propeller shaft 9, and a driving wheel 10 is driven by a differential gear 8.

A pressure control valve 11 generates a controlled line oil pressure PL by controlling an output oil pressure of the oil pressure pump 2, and the line oil pressure PL controlled by the pressure control valve 11 is fed to an oil pressure chamber 12 for applying a required pressure to the secondary pulley 5b. The pressure control valve 11 also supplies a lubricating oil indicated by "Lub". A flow control valve 13 controls a flow of the oil depending on the line oil pressure PL and an oil pressure with a flow controlled to a designated value PP is fed to an oil pressure chamber 14 for controlling a gap of the primary pulley 5a. A controller 15, such as a computer controls a line pressure duty solenoid 16, a speed shift duty solenoid 17, a direct coupling duty solenoid 18, a clutch duty solenoid 19 and the internal combustion engine 1 based on the input signals of various sensors to be mentioned later on. The line pressure duty solenoid 16 generates the line oil pressure PL by making a duty control of the pressure control valve 11 from a signal of the controller 15. The speed shift duty solenoid 17 makes a duty control of the flow control valve 13 from a signal of the controller 15, and controls the oil pressure PP for supplying to the oil pressure chamber 14. Sensor signal inputs to the controller 15 consist of a rotating speed sensor A 20 for detecting an output shaft rotation of the torque converter 3, a rotating speed sensor B 21 for detecting an input shaft rotation of the continuous transmission 5, a rotating speed sensor C 22 for detecting an output shaft rotation of the continuous transmission 5, a primary pressure sensor 23 for measuring an oil pressure fed to the oil pressure chamber 14, a line pressure sensor 24 for measuring a line oil pressure, and sensors for detecting driving or running information such as a throttle opening sensor or an oil temperature sensor abbreviated in the drawings.

In FIG. 2 showing a functional block diagram of the controller 15, an engine torque computing means 25 is for computing a torque of the internal combustion engine 1, a primary rotating speed detecting means 26 is for detecting a rotating speed of the primary pulley 5a by the rotating speed sensor B 21, a secondary rotating speed detecting means 27 is for detecting a rotating speed of the secondary pulley 5b by the rotating speed sensor C 22, a throttle opening sensor 28 is for detecting a throttle valve opening not shown in the drawing, and a driving condition detecting means 29 is for detecting a driving and running conditions. Furthermore, a CVT input torque computing means 30 is for computing an input torque of the continuous transmission 5 from an output of the engine torque computing means 25 and a detected value of the diving condition detecting means 29, a transmission ratio computing means 31 is for computing a transmission ratio of the continuous transmission 5 from signals of the primary rotating speed detecting means 26 and the secondary rotating speed detecting means 27, and an aimed line pressure compensation computing means 32 is for computing a compensated value of an aimed line oil pressure PLOBJHOS from the throttle opening sensor 28 and the detected value of the driving condition detecting means 29.

A possible output line pressure computing means 33 is for computing a possible output line oil pressure PROBLEMAX of the oil pressure pump 2 from any one signal out of an output of the primary rotating speed detector 26, the rotating speed sensor A 20, that is, from a rotating speed of the internal combustion engine 1 or the driving condition detector 29. An aimed line pressure base value computing means 34 is for computing a base value of an aimed line oil pressure PLOBJBASE from a torque value of the CVT input torque computing means 30 and a transmission ratio of the transmission ratio computing means 31, and finally the base value of the aimed line oil pressure and the compensated value from the aimed line pressure compensation computing means 36 are added by an adder 36 for determining an aimed line oil pressure PLOBJCAL Here, the control means 15 includes a memory, wherein a characteristic curve, for example, of the oil pressure pump 2 of the possible output line oil pressure for each rotating speed is stored as a map data.

In the line pressure control device for the continuous transmission in the automotive vehicle configured as shown above in the embodiment 1, a function of the controller 15 is explained in the flow chart of FIG. 3. First of all, in step 301 the input torque of the continuous transmission 5 from the CVT input torque computing means 30 and the transmission ratio from the transmission ratio computing means 31 are computed from the signals of a torque value computed by the engine torque computing means 25, an input rotating speed detected by the primary rotating speed detecting means 26, and an output rotating speed detected by the secondary rotating speed detecting means 27. From the above computed results of the input torque and the transmission ratio, the base value of the aimed line oil pressure is computed using the aimed line pressure base value computing means 34. In the next step 302, the compensated value of the aimed line oil pressure is computed by the aimed line pressure compensation computing means 32 depending on the running conditions using signals of the throttle opening sensor 28 and other sensors like the oil temperature sensor or so forth not shown in the drawing.

Then in step 303, the aimed line oil pressure is determined by adding the base value and the compensated value of the aimed line oil pressure with the adder 36. In step 304, the possible output line oil pressure is computed from an output of the primary rotating speed detecting means 26, that is, the rotating speed of the internal combustion engine 1, the characteristic data of the oil pressure pump stored beforehand in the memory 15 shown in FIG. 5 as an example, and a result of the driving condition detecting means 29. In FIG. 5, a curve D1, curve D2, and a curve D3 respectively correspond to a duty of 0%, 50%, and 100% of a line duty solenoid. In step 305, the aimed line oil pressure in step 303 and the possible output line oil pressure in step 304 are compared.

In this comparison, if the aimed line oil pressure is lower than the possible output line oil pressure, a process goes to step 307 and returns to step 301 for repetition, and the control means 15 executes an usual operation of a transmission by controlling the line pressure duty solenoid 16 and the transmission duty solenoid In step 305, if the aimed line oil pressure is higher than the possible output line oil pressure, the line oil pressure is judged to be deficient and a process goes to step 306, wherein the control means 15 takes measures for raising the rotating speed and decreasing the output torque of the internal combustion engine 1. Measures to be taken here is, for example, to delay in an ignition timing by manipulating the internal combustion engine 1, and in this case the transmission ratio is adjusted by a degree according to an increment of the rotating speed of the internal combustion engine 1.

The abovementioned process is shown in FIG. 4. FIG. 4(*a*) shows a line pressure abnormal judging timing pulse A generated in the controller 15, and repeats a processing routine in FIG. 3 periodically according to each timing of the pulse, FIG. 4(*b*) shows a line pressure abnormal detecting signal B, FIG. 4(*c*) shows a torque dropping command signal C, and FIG. 4(*d*) shows an engine output torque D of the internal combustion engine 1. In step 305 in FIG. 3, if the line oil pressure is judged to be deficient due to a change of the running conditions, a line pressure abnormality detecting signal B is high at timing t1 in FIG. 4 is generated, and according to the line pressure abnormality detecting signal B, a torque dropping command signal C is output for dropping the output torque of the engine 1. As an engine output torque curve D in FIG. 4 shows, the output torque of the engine 1 is dropped even when the output torque of the engine 1 is increasing while the torque dropping command signal C is energized, and therefore, the slip of the belt is avoidable. In FIG. 4, the curve E shows the engine rotating speed of the internal combustion engine, the curve F shows the possible line oil pressure and the curve G shows the aimed line oil pressure, timing T1 shows the timing when the line pressure abnormal detecting signal B is high, timing T2 shows the timing when the line pressure abnormal detecting signal B is low again and period T is defined between the timing T1 and T2.

By comparing the present invention in FIG. 4 with the prior art in FIG. 7, the advantage of the present invention over the prior art becomes apparent from a summarized explanation as in the following.

In FIG. 4 according to the present invention, the rotating speed of the internal combustion engine 1 shown as a curve E is controlled to raise the output oil pressure of the oil pressure pump 2 corresponding to a change of the aimed line oil pressure shown as a curve G. In this case, if the engine 1 is unable to catch up with the change of the aimed line oil pressure, the aimed line oil pressure is lowered to a value shown as an aimed pressure shift curve G1 corresponding to a torque drop of the internal combustion engine 1 as is easily understood from the curve D and the curve G. Therefore, as the speed of the internal combustion engine 1 of the curve E is increased while avoiding the slip of the belt, the output oil pressure of the oil pressure pump 2 is raised to a point exceeding the original aimed line oil pressure, which is detected in step 305 in FIG. 3 for canceling the torque drop of the internal combustion engine 1. Namely, as a decrease of the torque is periodically repeated in step 307 in FIG. 3, the possible output line oil pressure computed by the possible output line pressure computing means 33 is repeatedly computed until the possible output line oil pressure becomes larger than the original aimed line oil pressure, which is caused by an increase in the rotating speed of the internal combustion engine 1 or an increase in the output of the primary rotating speed detecting means 26. Thus, the slip of the belt is avoidable under any change of the running conditions.

Figure 7:
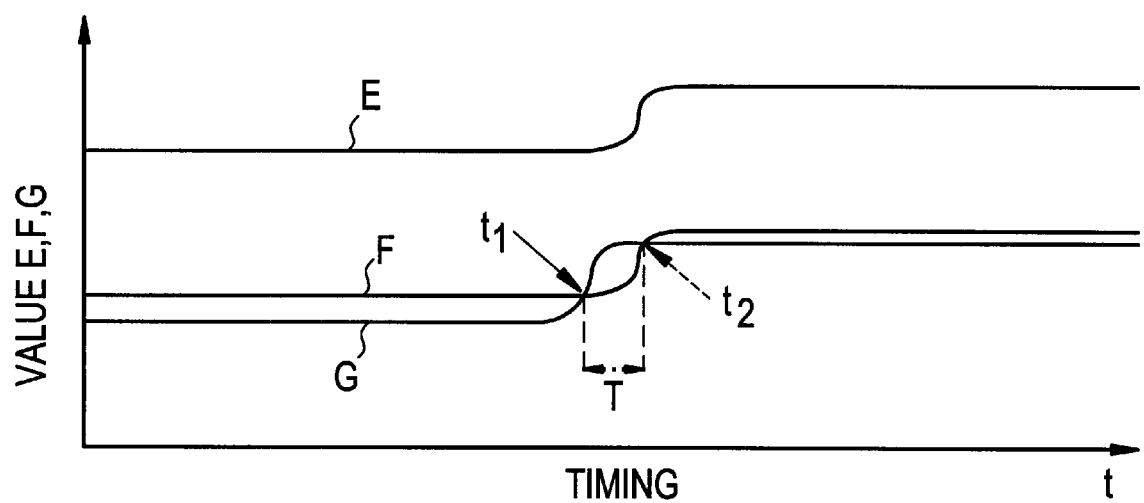
FIG. 7 is a characteristic curve of the line pressure control device for explaining the issues to be solved in the prior art.

Contrary to the above, in FIG. 7 of the prior art, while the rotating speed of the internal combustion engine 1 shown as a curve E is increasing, if an aimed line oil pressure shown as a curve F exceeds a possible output line oil pressure shown as a curve G during a period T, the slip of the belt can not be suppressed because no torque dropping control is executed.

What is claimed is:

1. A line pressure control device for a continuous transmission for an automotive vehicle, wherein a continuous transmission mechanism is actuated by an controlled oil pressure in an oil pressure line and outputs a transmitted speed from a rotating speed of an internal combustion engine, the line pressure control device comprising:

an oil pressure pump actuated by the internal combustion engine and generating an output oil pressure in the oil pressure line, a pressure control means for generating the controlled oil pressure in the oil pressure line by controlling the output oil pressure of said oil pressure pump, a throttle opening sensor for generating a throttle opening signal based on a opening of a throttle valve in the internal combustion engine, an engine rotating speed sensor for generating an engine rotating speed signal based on a rotating speed of the internal combustion engine, a transmission rotating speed sensor for generating an input rotating speed signal and an output rotating speed signal based on an input rotating speed and an output rotating speed of the continuous transmission mechanism respectively, and a controller including a memory for memorizing the output oil pressure characteristics for a rotating speed of said oil pressure pump, wherein said controller computes an input torque to the continuous transmission mechanism, a required line oil pressure for transmitting said input torque from said throttle opening signal, said input rotating speed signal and said output rotating speed signal, and a possible output line oil pressure from said output oil pressure characteristics and said engine rotating speed signal, and said controller controls the speed and output torque of the internal combustion engine so that said required line oil pressure becomes no more than said possible output line oil pressure by comparing said required line oil pressure with said possible output line oil pressure.

2. The line pressure control device for the continuous transmission mechanism in the automotive vehicle claimed in claim 1, wherein if said possible output line oil pressure is judged smaller than said required line oil pressure, said controller controls in a way to raise said speed of the internal combustion engine, and lower a transmission ratio of the continuous transmission mechanism, thereby decreasing said output torque of the internal combustion engine.

* * * * *